2,816,659
METHOD OF SEPARATING PHASES BY CENTRIFUGAL FORCE

Jan J. van Deemter and Kornelis Rietema, Amsterdam, Netherlands, assignors to Shell Development Company, New York, N. Y., a corporation of Delaware No Drawing. Application June 20, 1955
Serial No. 516,756

Claims priority, application Netherlands June 30, 1954

5 Claims. (Cl. 210—65)

The invention relates to a method of separating phases of which the phase occurring in the greater quantity is liquid, such as the separation of solid particles from a liquid or the separation of the dispersed phase from a continuous phase in emulsions, by the use of centrifugal force in a stationary separator, particularly to hydrocyclone or a hydro-whirl chamber.

A stationary centrifugal separator of the type herein considered includes an enclosed centrifugation chamber shaped as a surface of revolution having one or more tangential inlets near one axial end for admitting the mixture to be separated in a direction to cause circumferential or vertical motion thereof, an overflow outlet for discharging the separated material of lower density (usually the liquid occurring in predominating amount in the feed) which moves toward the axis and an underflow outlet for discharging the other material which collects near the radially outer part of the chamber. Such separators are sometimes classified as cyclones and whirl chambers, the invention being applicable to both types: In a cyclone the enclosing side wall of the centrifugation chamber is substantially tubular, e. g., cylindrical, at the end near the tangential inlet, the overflow outlet is situated near said end, being usually formed by a vortex-finder exit tube that extends axially into the cyclone for a part of the length thereof, and the underflow outlet is at the opposite end, e. g., at the apex when the axis of the chamber is upright and the cyclone has a downwardly convergent closure, or at the periphery when the enclosing wall is mainly cylindrical and/or when the axis is horizontal. In the whirl chamber both the overflow and underflow outlets are situated near or at the end opposite to the inlet end; the former is a central opening in the end closure wall of the chamber and the latter is situated either near or at the periphery or is arranged co-axially with the central overflow opening.

From the foregoing description it is clear that the cyclone operates on the countercurrent principle and the whirl chamber on the parallel-flow principle, but this does not constitute any essential difference as regards the invention.

When a low-viscosity fluid, such as a gas containing suspended particles, is admitted tangentially into a centrifugation chamber near the outer wall it flows peripherally with a certain tangential velocity almost equal to the inlet velocity save for a thin boundary layer adjoining the wall; in flowing wtih a spiral motion toward the axis the tangential velocity increases up to a tube-like region near the axis of rotation, within which region the tangential velocity again becomes less. This increase in tangential velocity results in high centrifugal forces. In addition to such spiraling flow the vortically moving fluid partakes of a flow in the axial direction away from the inlet; in the case of such a low-viscosity fluid the angular speed is somewhat but not greatly reduced by friction against the wall, so that the centrifugal forces remain powerful even at the end remote from the inlet.

In certain cases involving the treatment of mixtures whereof the greater part is a liquid, e. g., in separating crude petroleum emulsions in which viscous oil forms the continuous phase and water the dispersed phase, or suspensions of solid catalyst particles in viscous oil, little or no separation is effected in the hydrocyclone or hydrowhirl chamber as a result of wall friction caused by too great a viscosity. The separating power of these devices depends mainly on the centrifugal force generated by high-speed rotation of the mixture. This rotation is, however, checked to such an extent when the wall friction is high that practically no increase or even a decrease in tangential velocity occurs in passing toward the axis, while the rotation is also checked in passing longitudinally away from the inlet.

It is possible to reduce the check of the speed of rotation by heating the feed mixture to be separated prior to entry into the centrifugation chamber in such a way that the high viscosity is reduced to an extent that it no longer constitutes an obstacle to the separation. For this purpose, however, a considerable amount of heat must be supplied.

It is an object of this invention to improve the separation of mixtures containing liquid as the major constituent in stationary centrifugal separators in a manner requiring but a small amount of heat.

It has now been found in accordance with the invention that when even a small amount of heat is supplied to the side wall of the centrifugation chamber to bring the wall to a temperature above that of the mixture charged the separating power of the hydrocyclone or hydro-whirl chamber is increased to a considerable extent.

By increasing the temperature of the wall, the viscosity of the continuous phase of the mixture to be separated is reduced at the boundary region adjoining the wall. As a result, friction along the wall is greatly reduced, so that the mixture introduced tangentially will attain a higher speed of rotation, leading to greater centrifugal force; consequently, the separation between the continuous and dispersed phases is improved.

It is evident that the process produces the greatest possible effect when the heating causes a relatively great reduction in viscosity, or, stated in other words, when the continuous phase of the mixture to be separated has a low viscosity index. The invention is, therefore, particularly applicable to mixtures consisting predominantly of oil that has a viscosity index below zero.

It has been found that the temperature of each of the phases separated need only differ by a few degrees, e. g., from 2–10° C., from the temperature of mixture introduced in order to effect a significant improvement in the separating power of the hydrocyclone or hydro-whirl chamber. Such a small rise in temperature requires the supply of only a small amount of heat. The wall may be heated in any suitable manner, e. g., by means of steam, an oil bath, or a coil through which hot liquid flows, or by an electrical heating element. The heat may be applied only to the side wall of the centrifugation chamber or both to the side wall and to the end closures. The wall temperature is such to cause a temperature rise in the mixture of the magnitude above indicated.

Example 1

Tests were performed in a hydrocyclone having an upright axis and the following dimensions:

|   | mm. |
|---|---|
| Diameter of cylindrical upper part | 75 |
| Length of cylindrical upper part | 200 |
| Length of bottom conical closure | 180 |
| Diameter of tangential inlet in top of cylindrical upper part | 15 |
| Diameter of top overflow outlet | 15 |
| Diameter of underflow outlet at cone apex | 5 |

The mixture supplied through the tangential inlet was a gas oil having a viscosity of 8 centistokes at 20° C. and 4 centistokes at 40° C., (i. e., with a viscosity index of about minus 34) in which were suspended 3-4% by weight of cracking catalyst particles mainly varying from 40-70 microns in diameter. This mixture was pumped at a temperature of 20° C. into the hydrocyclone at the rate of 0.42 liter per second, with a pressure drop of 0.15 atmosphere.

When the hydrocyclone was operated without heating of the external wall 0.38 liter per second of gas oil with a concentration of 2.29% by weight was discharged from the overflow outlet; simultaneously 0.04 liter per second of gas oil containing 8.72% by weight of catalyst was drawn off from the underflow outlet.

When operating the hydrocyclone under like conditions except that the cylindrical wall was heated by means of steam, which brought the inside of the wall to a temperature of about 100° C., and the feed rate increased to 0.44 liter per second, 0.40 liter per second of gas oil with a catalyst content of 1.45% by weight were drawn off from the top while 0.04 liter per second of gas oil with a catalyst content of 25.3% by weight were drawn off from the bottom. The heating in this run raised the temperature only slightly, the temperature of the materials discharged being only 2° C. above that of the feed mixture.

*Example II*

A crude petroleum emulsion with a water content of about 20% by weight and a viscosity of 8 centistokes at 20° C. was introduced into a hydrocylone of the dimensions given in Example I. The emulsion was pumped at a temperature of 20° C. into the tangential inlet at a rate of 2 cu. m. per hour. The hydrocyclone was operated in such a way that three-fourths by volume of the material was drawn off through the overflow outlet and one-fourth through the underflow outlet.

Without heating of the external wall, an oil containing 40% by weight of water was removed through the underflow outlet and an oil with a water content of 13% by weight via the overflow outlet.

On heating the cylindrical wall by means of steam and thereby heating the inner surface of the wall to about 100° C., an oil containing 70% by weight of water was drawn off via the underflow outlet, while an oil with only 3% by weight of water was drawn off via the overflow outlet. The difference between the temperatures of the feed emulsion and the separated liquids was only 3° C.

We claim as our invention:

1. In the method of separating the phases of a mixture of which the phase occurring in the greater quantity is liquid which comprises the steps of charging said mixture tangentially into the centrifugation chamber of a stationary separator having an enclosing side wall, forming a vortex within said chamber and thereby separating said phases by centrifugal force, and discharging the separated phases of relatively lower and higher density through overflow and underflow outlets, respectively, the improvement of heating the said enclosing side wall of the chamber to a temperature above that of the said mixture charged to the chamber.

2. A method according to claim 1 wherein the heating is so regulated that the temperature difference between the mixture charged to the chamber and the separated phases is between about 2 and 10° C.

3. A method according to claim 1 wherein said mixture contains as the said liquid an oil having a viscosity index below zero.

4. A method of separating hydrocarbon oil from cracking catalyst suspended therein which comprises subjecting it to the steps defined in claim 1.

5. A method of separating an emulsion of crude petroleum and water which comprises subjecting it to the steps defined in claim 1.

References Cited in the file of this patent

UNITED STATES PATENTS

| | | |
|---|---|---|
| 1,875,341 | Horne et al. | Sept. 6, 1932 |
| 2,447,149 | Wier | Aug. 17, 1948 |

FOREIGN PATENTS

| | | |
|---|---|---|
| 500,717 | Germany | June 24, 1930 |
| 465,897 | Great Britain | May 14, 1937 |